(12) United States Patent
Elsäβer et al.

(10) Patent No.: US 8,201,541 B2
(45) Date of Patent: Jun. 19, 2012

(54) CLOSURE DEVICE AND OPERATING METHOD

(75) Inventors: Alfred Elsäβer, Keltern (DE); Martin Helmis, Stuttgart (DE)

(73) Assignee: Mahle International GmbH (DE)

( * ) Notice: Subject to any disclaimer, the term of this patent is extended or adjusted under 35 U.S.C. 154(b) by 142 days.

(21) Appl. No.: 12/850,285

(22) Filed: Aug. 4, 2010

(65) Prior Publication Data

US 2011/0036412 A1 Feb. 17, 2011

(30) Foreign Application Priority Data

Aug. 5, 2009 (DE) .................... 10 2009 036 192

(51) Int. Cl.
*F02D 9/08* (2006.01)

(52) U.S. Cl. .............. 123/336; 123/568.21; 123/184.53; 123/184.56; 123/306; 123/399

(58) Field of Classification Search ............ 123/336, 123/337, 306, 399, 184.53, 184.56, 568.21; 701/108, 110; 137/2, 624.11
See application file for complete search history.

(56) References Cited

U.S. PATENT DOCUMENTS

| | | | |
|---|---|---|---|
| 5,105,784 A | 4/1992 | Davis et al. | |
| 6,360,719 B1 | 3/2002 | Uitenbroek | |
| 7,418,945 B2 | 9/2008 | Elsasser et al. | |

FOREIGN PATENT DOCUMENTS

| | | |
|---|---|---|
| DE | 3737823 A1 | 8/1989 |
| DE | 4414849 A1 | 11/1995 |
| DE | 19830575 A1 | 1/2000 |
| DE | 10240913 A1 | 3/2004 |
| DE | 102006015589 A1 | 10/2007 |
| DE | 102006037934 A1 | 2/2008 |
| DE | 102007004264 A1 | 7/2008 |
| DE | 102007047728 A1 | 11/2008 |
| JP | 63012827 A | 1/1988 |

OTHER PUBLICATIONS

English abstract for DE-102007047728.
English abstract for JP-63012827.
English abstract for DE-10240913.
English abstract for DE-3737823.
European Search Report for EP-10169990.8.
English abstract provided for DE-102006037934.
English abstract for DE-102007004264.
English abstract for DE-4414849.

*Primary Examiner* — Hai Huynh
(74) *Attorney, Agent, or Firm* — Rader, Fishman & Grauer PLLC

(57) ABSTRACT

The invention relates to a method for operating at least one rotating closure element in a flow channel; alternately opening and blocking the flow channel relative to a reference variable and with an adjustable phase position; flowing through a cross-section; changing a phase position; and utilizing at least one of a flow force and a flow torque to act on the closure element for at least one of temporarily accelerating and temporarily decelerating the closure element.

20 Claims, 6 Drawing Sheets

CLOSURE DEVICE AND OPERATING METHOD

CROSS-REFERENCES TO RELATED APPLICATION

This application claims priority to German application DE 10 2009 036 192.8 filed on Aug. 5, 2009, which is hereby incorporated by reference in its entirety.

TECHNICAL FIELD

The present invention relates to a method for operating at least one rotating closure element which, in a flow channel, alternately opens and blocks a cross-section through which a flow can pass. Moreover, the invention relates to a closure device for controlling a flow channel, in particular of a piston engine.

BACKGROUND

In a fresh air channel, e.g. of a piston engine, upstream of gas exchange valves, closure devices can be used by means of which the respective flow channel can be controlled. The closure device can comprise at least one closure element, e.g. a flap gate or a rotary slide valve which, during operation, rotates permanently about a rotational axis, a so-called rotating closure element. Such a rotating closure element can also be designated as continuously operating closure element or closure element operating with consistent rotational direction, which differs from a discontinuously operating or oscillating closure element which, during operation, is alternately switched between two end positions, namely an open position and a closed position with alternating rotational direction.

By means of rotating closure elements, pressure vibrations can be generated or existing pressure vibrations can be intensified within the flow channel. Positive pressure amplitudes of said pressure vibrations can be utilized in the fresh air channel of the piston engine, e.g., for generating a pulse charging. Negative pressure amplitudes of said pressure vibrations can be used in a different application for adjusting the exhaust gas recirculation rate. It is principally also possible to generate by means of such a rotating closure element, pressure vibrations downstream of gas exchange valves in an exhaust gas channel so as to influence the exhaust gas recirculation rate via the positive pressure amplitudes. Further, it is possible to influence other parameters or components of the piston engine with such closure devices. For example, the vibrations generated in the fresh air channel by means of the rotating closure element can be utilized for influencing the pollutant emission and/or the fuel consumption. Further, by means of the pressure vibrations, the operating behavior of an exhaust gas turbocharger can be influenced.

Important for such permanently rotating closure elements is the adherence or the adjustment of a phase position relative to a reference variable, in particular a reference time or a reference frequency. The rotating closure element runs through a periodically repeating rotation, the movement of which runs through a rotation angle of 0° to 360°. In a piston engine, the rotational movement of the closure element is synchronized, e.g., with the stroke movement of pistons of the piston engine or with switching times of gas exchange valves. This results inevitably in synchronization with the rotational movement of a crankshaft of the piston engine. Thus, e.g., the rotational position or rotational movement of the crankshaft can be used as reference time or reference variable for the phase position of the rotating closure element.

In order to vary the effect of the flow-dynamic processes, which are generated by means of the closure element, on the operation of the piston engine or the operating parameters of the piston engine such as, e.g., exhaust gas recirculation rate, fuel consumption, pollutant emission, or to adapt them to changing operating points, it can be necessary to change the phase position of the rotating closure element relative to the reference variable, thus in particular relative to the crankshaft angle. For example, an opening time of the rotating closure element can be shifted from +10° crankshaft angle by 5° towards early, thus to +5° crankshaft angle, or towards late, thus to +15° crankshaft angle.

Such changes of the phase position are supposed to take place within a time as short as possible so as to be able to perform the adaptation of the closure device to varying operating points of the piston engine as fast as possible. To be able to adapt the phase position of the rotating closure element during the operation, thus in a dynamic manner, relatively high forces and/or torques are required which, for an adequate drive, involves relatively complicated control or feedback control demands.

SUMMARY

The present invention is concerned with the problem to provide, for a closure device of the above mentioned type and for an associated operating method, an improved embodiment which is in particular characterized in that changing the phase position of the rotating closure element is simplified. In particular, the energy expenditure necessary for changing the phase position and the time necessary for the change are to be reduced.

This problem is solved according to the invention by the subject matters of the independent claims. Advantageous embodiments are subject matter of the dependent claims.

The invention is based on the general idea to specifically utilize, for temporarily accelerating or decelerating the closure element, flow forces and/or flow torques which act anyway on the closure element during operation. The invention makes use of the knowledge that forces or torques, which depend on the rotation angle, act on the rotating closure element. In particular, the rotating closure element must be driven in certain rotation angle phases against flow forces, whereas in other rotation angle ranges, it is driven by the flow forces. Said forces or torques acting on the closure element, which vary greatly during the rotational movement, make it difficult in a conventional approach to maintain a continuous rotational movement for the closure element if the same is driven, e.g., by means of an electric motor. Through utilization of said forces, which are available anyway, the closure element can be accelerated or decelerated in a specific manner to implement the desired change of the phase position. Hereby, the energy expenditure for changing the phase position is considerably reduced. Moreover, the phase adaptation can be implemented in a shorter time. Since a piston engine, in particular when used in a motor vehicle, frequently changes its operating point, the approach proposed herein has a significant effect on the energy consumption and consequently also on the service life of the closure device and its electronics.

According to an advantageous embodiment, maintaining a desired phase position can be implemented in that only in at least one predetermined rotation angle range of the closure element, a feedback control of the rotation position or rotation angle, thus a position control is carried out. Apart from that, a feedback control of the rotational speed, thus a speed control is then carried out. This means that only in the at least one predetermined rotation angle range, a target-actual comparison of the phase position is performed by controlling the phase position and in case of a certain deviation, a correction of the phase position takes place, while in the remaining rotation angle range, only the speed is controlled which is selected to be suitable for the reference variable. Thus, during the remaining rotation angle range, the position, hence the rotation position of the closure element is controlled such that a position control exists. For example, an electric motor for driving the closure element can be subject to a preselected energization pattern which can comprise a temporal course of the amplitude and a frequency of the energization. The proposed approach reduces the control demand and the associated energy consumption. This proposal utilizes the knowledge that by means of a control, potentially occurring target-actual deviations can be compensated or corrected by a feedback control phase which takes place only in a predetermined rotation angle range. Furthermore, this approach utilizes the knowledge that the flow forces or flow torques, which vary greatly and which act on the closure element, generate a high control demand during a complete rotation if the position of the closure element is to be controlled over its entire rotation angle range to a fixed phase angle relation to the piston engine. If, however, in rotation angle ranges in which the greatly varying flow forces occur, the rotational movement of the closure element is controlled only with respect to the rotational speed, no or only minor control interventions take place, whereby the energy consumption of a corresponding closure element is considerably reduced.

In an alternative embodiment, maintaining a desired actual phase position over the entire rotation angle range of the closure element can take place by a feedback control, wherein a target phase position is modulated or varied depending on the flow forces and/or flow torques and/or depending on the rotation angle of the closure element. The modulation of the target value of the phase position to be maintained over the rotation angle range considers the forces or torques which depend on the rotation angle of the closure element and which act thereon, and thereby allows an energy-saving control for adjusting a desired rotational movement for the closure element.

In a further alternative embodiment, maintaining a desired actual phase position over the entire rotation angle range of the closure element can also take place by a feedback control, wherein a range of permissible deviations of the actual phase position from the target position is modulated or varied depending on the flow forces and/or flow torques and/or depending on the rotation angle position of the closure element. The modulation of the range of permissible actual-target deviations with respect to the phase position to be maintained considers the forces or torques which depend on the rotation angle of the closure element and which act thereon, and thereby allows an energy-saving feedback control for adjusting a desired rotational movement for the closure element. As long as the occurring deviation between actual phase position and target phase position stays within said permissible range, no control intervention takes place.

In another alternative embodiment, maintaining a desired actual phase position over the entire rotation angle range of the closure element can also take place by a feedback control, wherein parameters of the feedback control (control parameters) and/or parameters of the respectively used controller (controller parameter) are modulated or varied depending on flow forces and/or flow torques and/or depending on the rotation angle position of the closure element. The modulation of the control parameters and/or the controller parameters considers the forces or torques which depend on the rotation angle of the closure element and which act thereon, and thereby allows an energy-saving feedback control for adjusting a desired rotational movement for the closure element. As long as, during the course of the movement of the closure element, an exact adherence to the target phase position is not important, the control and/or controller parameters can be weakened for occurring deviations between the actual phase position and the target phase position so that only a reduced control intervention with reduced control demand takes place.

Further important features and advantages arise from the sub-claims, from the drawings, and from the associated description of the figures based on the drawings.

It is to be understood that the above mentioned features and the features yet to be explained hereinafter can be used not only in the respectively mentioned combination but also in other combinations or alone without departing from the scope of the present invention.

BRIEF DESCRIPTION OF THE DRAWING

Preferred exemplary embodiments of the invention are illustrated in the drawings and are explained in the following description in more detail, wherein identical reference numbers refer to identical, or similar, or functionally identical components.

In the schematic figures

DETAILED DESCRIPTION

Figure 1:
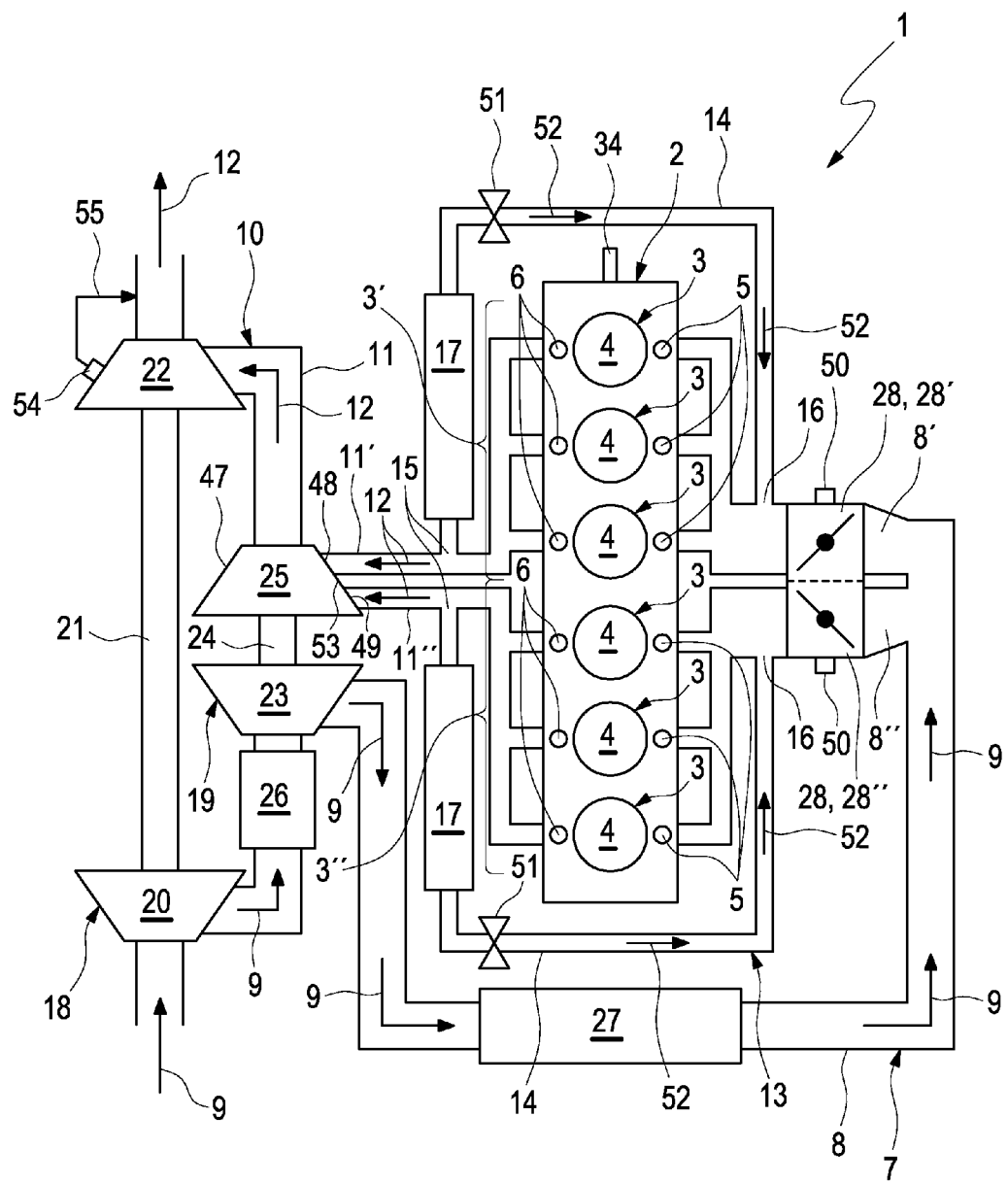
FIG. 1 shows a greatly simplified, circuit diagram-like basic illustration of a piston engine.

According to FIG. 1, a piston engine 1 as it can be used in motor vehicles, comprises, e.g., an engine block 2 including a plurality of cylinders 3, each of which encloses a combustion chamber 4 and in which a non-illustrated piston is arranged in a stroke-adjustable manner. In the example, purely exemplary and without loss of generality, exactly six such cylinders 3 are arranged in series. To each combustion chamber 4, gas exchange valves, namely intake valves 5 and exhaust valves 6 are allocated, which are arranged within the engine block 2. In the example, for each combustion chamber 4, one intake valve 5 and one exhaust valve 6 is provided. It is obvious that two or more intake valves 5 or two or more exhaust valves 6 can be provided. The piston engine 1 serves preferably for the use as vehicle drive for commercial vehicles and passenger cars, namely, for example, in heavy duty commercial vehicles such as, e.g. construction vehicles and off-road vehicles.

Figure 6:
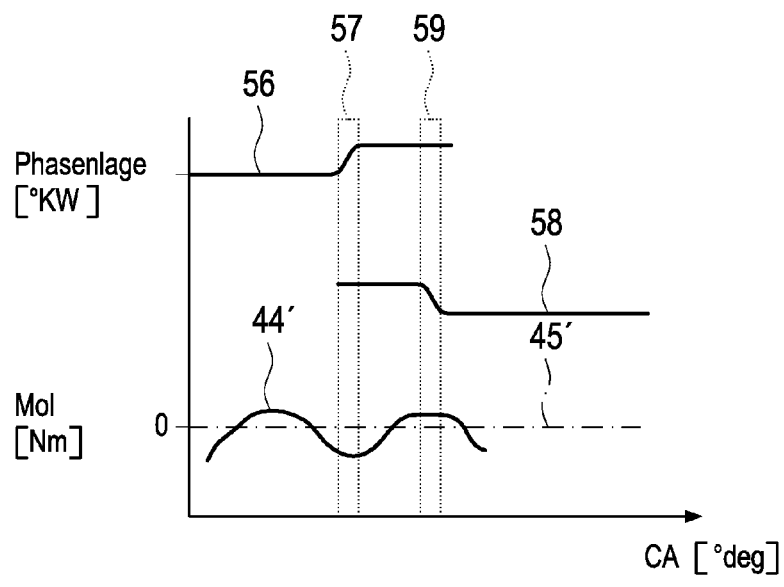
FIG. 6 shows a greatly simplified diagram for illustrating a change of a phase position of the closure element relative to a reference variable.
Figure 7:
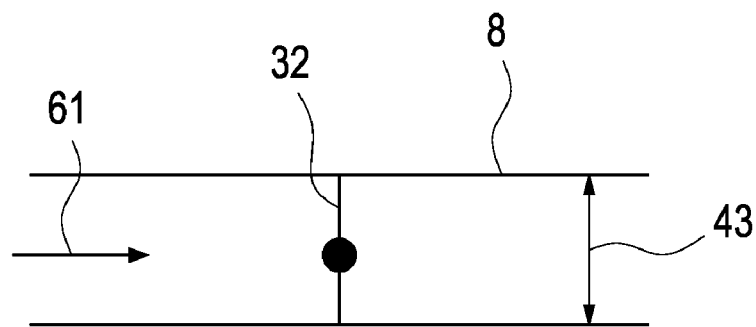
FIG. 7 shows a simplified cross-section of a closure element in the flow channel without recess.
Figure 8:
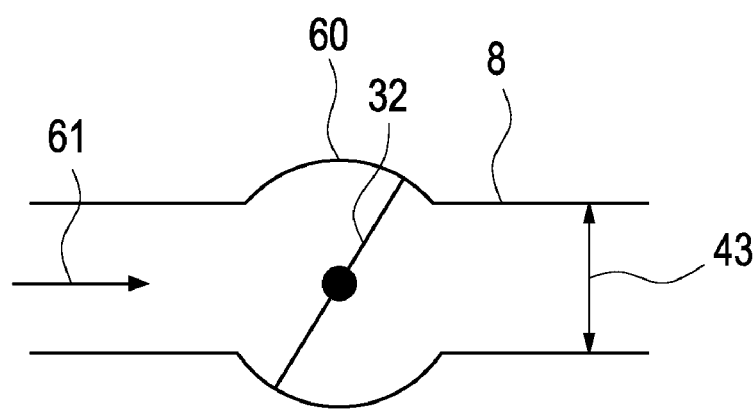
FIG. 8 shows a simplified cross-section of a closure element in the flow channel with recess.

In the piston engine 1, two cylinder groups are formed, namely a first cylinder group 3' and a second cylinder group 3" which are marked in FIG. 1 by curly brackets and which are indicated in the diagrams of FIGS. 6 to 8 with 1-3 for the cylinders 3 of the first group 3' and with 4-6 for the cylinders 3 of the second group 3". Each cylinder group 3', 3" includes at least one cylinder 3. In the example, each cylinder group 3', 3" includes three cylinders 3, thus a symmetrical distribution of the six cylinders 3 among the two cylinder groups 3', 3". It is principally also possible that more than two cylinder groups are present. It is principally also possible that each cylinder group 3', 3" can comprise more or less than three cylinders 3.

The piston engine 1 has a fresh air system 7 which serves for supplying fresh air to the combustion chambers 4. For this purpose, the fresh air system 7 has a fresh air line 8 which contains a fresh air path 9 which is indicated in FIG. 1 by arrows. Moreover, the piston engine 1 is equipped with an exhaust gas system 10 which serves for discharging exhaust gas from the combustion chambers 4. For this purpose, the exhaust gas system has an exhaust gas line 11 which contains an exhaust gas path 12 which is indicated by arrows. Moreover, the piston engine 1 is equipped with an exhaust gas recirculation system 13 by means of which it is possible to recycle exhaust gas from the exhaust gas system 10 to the fresh air system 7. For this purpose, the exhaust gas recirculation system 13 has at least one recirculation line 14. In the example, two such recirculation lines 14 are provided. Each recirculation line 14 runs from an extraction point or branch-off point 15 to an intake point 16. At the respective branch-off point 15, the respective recirculation line 14 is connected on the inlet side with the exhaust gas line 11. At the respective intake point 16, the respective recirculation line 14 is connected with the fresh air line 8.

In the example, the fresh air system 7 is configured at least in one section which is arranged adjacent to the combustion chambers 4 to have two tracts so that in this region, the fresh air line 8 has a first tract 8' for supplying to the first three combustion chambers 4 and a second tract 8" which serves for supplying to the second three combustion chambers 4. Here, the first fresh air tract 8' serves for supplying fresh air to the cylinders 3 of the first cylinder group 3', while the second fresh air tract 8' is provided for supplying fresh air to the cylinders 3 of the second cylinder group 3". Analog to this, also the exhaust gas system 10 is configured at least in one section, which is arranged adjacent to the combustion chambers 4, to have two tracts so that at least in a section arranged adjacent to the combustion chambers 4, the exhaust gas line 11 has a first tract 11' which is allocated to the cylinders 3 of the first cylinder group 3" and a second tract 11" which is allocated to the cylinders 3 of the second cylinder group 3". Accordingly, each of the two exhaust gas recirculation lines 14 is allocated to one of these tracts 8', 8" or 11', 11", respectively. In the example, each recirculation line 14 includes one exhaust gas recirculation cooler 17.

Further, in the illustrated example, the piston engine 1 is charged so that at least one charging device is provided. In the example, two charging devices are provided, namely a first charging device 18 and a second charging device 19. Both charging devices 18, 19 are configured in the example as exhaust gas turbocharger. Accordingly, the first charging device 18 comprises a first compressor 20 which is arranged in the fresh gas line 8 and which is drivingly connected by means of a first drive shaft 21 with a first turbine 22 which is arranged in the exhaust gas line 11. Accordingly, the second charging device 19 comprises a second compressor 23 which is arranged in the fresh air line 8 and which is drivingly connected by means of a second drive shaft 24 with a second turbine 25 which is arranged in the exhaust gas line 11. For this, the second compressor 23 is arranged downstream of the first compressor 20, while the second turbine 25 is arranged upstream of the first turbine 22. Between the first compressor 20 and the second compressor 23, a first charge air cooler 26 can be arranged in the fresh air line 8. Between the second compressor 23 and the combustion chambers 4, a second charge air cooler 27 can be arranged in the fresh air line 8.

Moreover, the piston engine 1 is equipped with at least one additional valve 28. In the example of FIG. 1, two such additional valves 28 are provided, namely a first additional valve 28' and a second additional valve 28". The respective additional valve 28 is arranged in the fresh air system 7 upstream of the intake valves 5. In the example, in each of the two tracts 8', 8", one such additional valve 28 is arranged. The first additional valve 28' is arranged in the fresh air tract 8', while the second additional valve 28" is arranged in the second fresh air tract 8". Thereby, each additional valve 28 is allocated to three combustion chambers 4.

In order to be able to increase the acceleration power of the piston engine 1, the exhaust gas recirculation system 13 according to FIG. 1 can be equipped with at least one blocking valve 51, by means of which a recirculation path 52 conveyed in the respective recirculation line 14 can be blocked, which recirculation path is indicated by arrows. Since no mass flow to the combustion chambers 4 takes place via the exhaust gas recirculation, more air is available.

At least one of the turbines 22, 25 can be configured in a variable manner according to FIG. 1. For this, turbines with wastegates 54 or with a variable turbine geometry 53 can be used. In the example, only the second turbine 25 is equipped with such a variable turbine geometry 53. The variable turbine geometry 53 allows a change of the inflow cross-section of the respective turbine 25. In this manner, on the one hand, the respective turbine 25 can be kept with a reduced exhaust gas mass flow at an increased speed so as to reduce, in case of a load demand, the so-called turbo hole, thus the response time of the exhaust gas turbocharger 19. On the other hand, by means of the variable turbine geometry 53, the dynamic pressure in the exhaust gas upstream of the respective turbine 25 can be increased, whereby the pressure gradient between the branch-off point 15 and the intake point 16 can be increased for the effectiveness of the exhaust gas recirculation system 13. However, hereby, the exhaust gas back pressure, against which the piston engine 1 works, increases. Consequently, the fuel consumption increases at the same engine load.

In operating points with reduced load and/or with reduced speed, the variable turbine geometry 53 can be actuated for adjusting a comparatively large inflow cross-section. Consequently, the exhaust gas back pressure decreases. A reduction of the exhaust gas recirculation rate, which typically occurs at the same time, can be compensated by a suitable phase position of the respective additional valve 28 according to FIG. 5. Consequently, in the respective operating point, a sufficiently high exhaust gas recirculation rate can be implemented even without back pressure increase by means of the variable turbine geometry 53. Thus, the fuel consumption of the internal combustion engine 1 can be reduced.

For turbines with wastegate 54, analog relationships apply since the exhaust gas back pressure influenced by the wastegate 54 controls or influences the exhaust gas recirculation rate. In FIG. 1, the first turbine 22 is exemplary equipped with a wastegate 54 for controlling a bypass 55 which bypasses the turbine 22 at least partially. By closing the wastegate 54, the exhaust gas pressure increases and the exhaust gas recirculation rate increases.

In a charged internal combustion engine 1, which comprises at least one turbine 22 in the exhaust gas system 10, which turbine is equipped with a wastegate 54 for controlling a bypass 55 which bypasses the turbine 22 at least partially, the respective wastegate 54 can be actuated in operating points with reduced load and/or speed in such a manner that a relatively large flow cross-section for the bypass 55 is obtained, whereas the at least one additional valve 28 is actuated in such a manner that the desired exhaust gas recirculation rate is obtained.

One of the turbines 22, 25, here, the second turbine 25 arranged upstream, can be configured as a twin turbine 47 in another embodiment and can comprise a first inlet 48 and a second inlet 49. The first exhaust gas tract 11' is connected to the first inlet 48 while the second exhaust gas tract 11" is connected to the second inlet 49. Thus, the first cylinder group 3' is ultimately allocated to a non-shown sub-turbine of the twin turbine 47 while the second cylinder group 3" is allocated to a non-shown second sub-turbine of the twin turbine 47.

Figure 2:
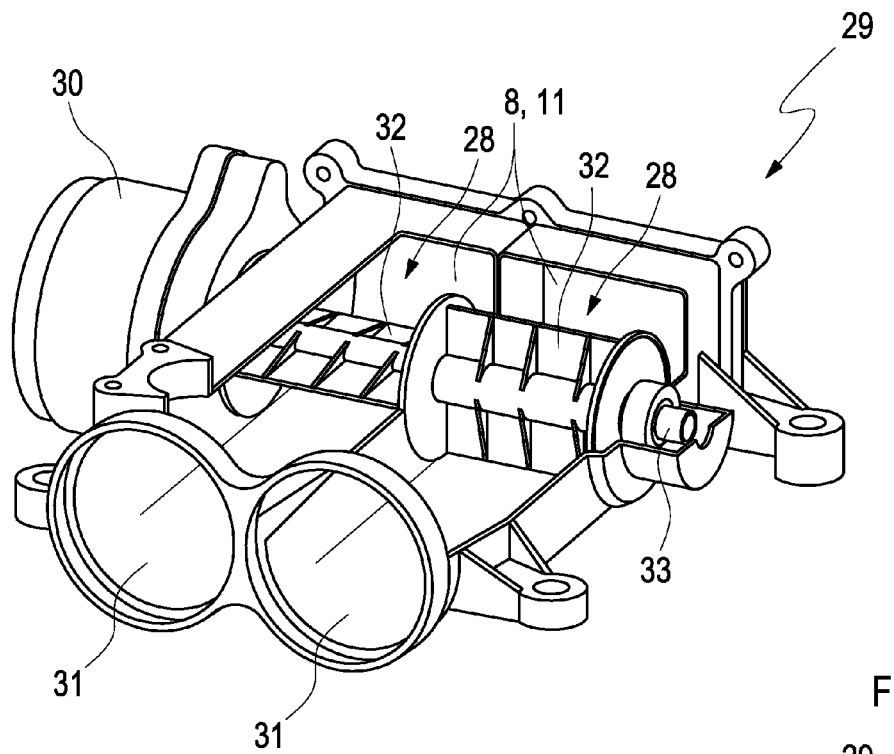
FIG. 2 shows a greatly simplified partial section of a closure device with two closure elements in a perspective view.

FIG. 2 shows an example for an example closure device 29 which has two valves 28 which can be activated by a common drive 30. As is apparent, the closure device 29 comprises two line sections 31 which are separated from one another in a gas-tight manner and by means of which the closure device 29 can be integrated in the two tracts 8', 8" of the fresh gas system 7. In the respective allocated channel section 31, the respective additional valve 28 includes a closure element 32 which, in the embodiments shown here, involves a flap gate 32 which can also be designated as 32. Alternatively, the closure element 32 can also involve another embodiment, e.g. a rotary slide valve. The closure element 32 configured as flap gate can also be designated as butterfly valve. The closure elements 32 or flaps 32 are arranged in a rotationally fixed manner on a common shaft 33 which is drivingly connected with the drive 30. The drive 30 is preferably configured to rotate the valve members 32 so that here rotating closure elements 32 are involved. The speed of the drive 30 or the closure elements 32 can correspond, for example, to ¾ of the speed of a crankshaft 34 of the piston engine 1 indicated in FIG. 1. In case of other numbers of cylinders and different engine design (inline engine, V-engine, W-engine, boxer engine), other correlations between speed of the respective closure element 32 and the crankshaft 34 can occur. Preferably, the closure device 29 can comprise two separate drives 30 for the two closure elements 32 so that the same can be operated independently from one another.

Figure 3:
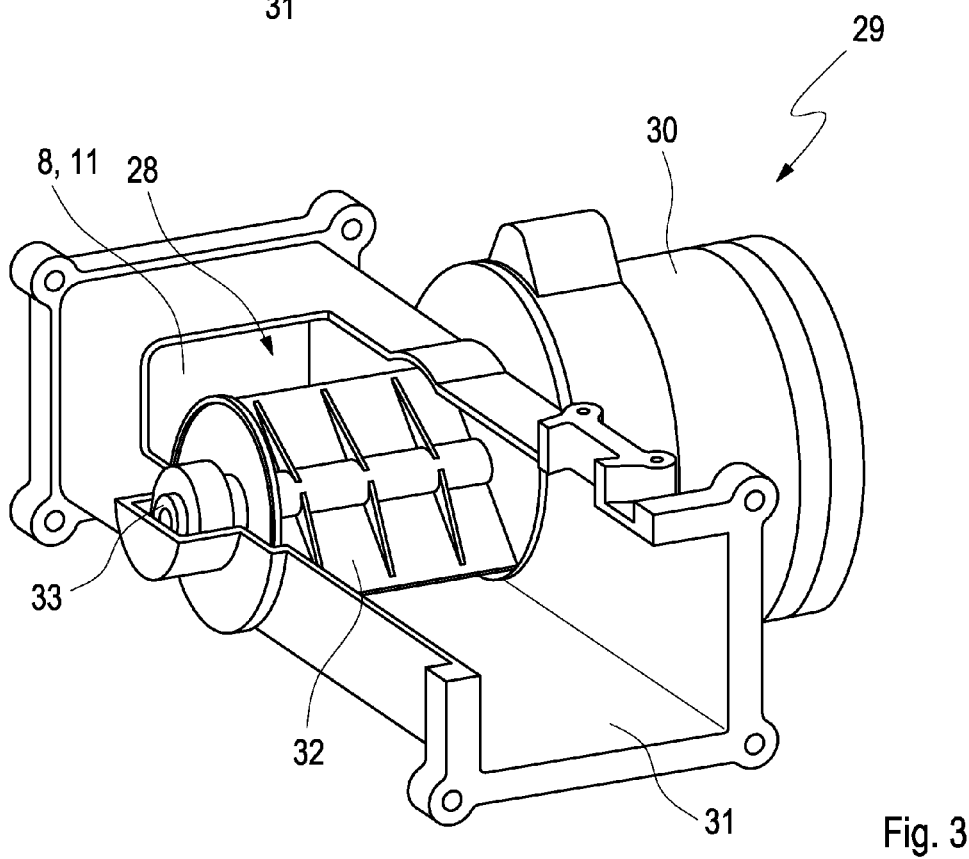
FIG. 3 shows a view as in FIG. 2, but in an embodiment of the closure device with only one single closure element.

FIG. 3 shows another embodiment of such a closure 29 which, in contrast to the embodiment shown in FIG. 2, has only one single additional valve 28. Accordingly, this embodiment comprises only one channel section 31 and one valve member 32 which is arranged in the channel section 31 and which is drivingly connected with the drive 30 via shaft 33. Preferably, for controlling the two tracts 8', 8", two such closure devices 29 are available which can be actuated independently from one another.

The embodiments shown in FIGS. 2 and 3 illustrate examples for suitable additional valves 28 which, when actuated, can alternately open and close the fresh air path 9. For this, the respective closure element 32 rotates during the operation of the piston engine 1, wherein with each full rotation, it passes a closed position twice, whereas it is open between two consecutive closed positions. The time interval between two consecutive closed positions or closing phases defines a switching frequency of the respective additional valve 28. Advantageously, the respective additional valve 28 is actuated synchronously to the crankshaft 34 so that at least during a stationary actuation of the respective additional valve 28, a constant correlation between the speed of the crankshaft 34 and the switching frequency of the respective additional valve 28 exists. For example, the closure element 32 rotates with the same or with double or with triple of the speed of the crankshaft 34.

The above mentioned correlation between crankshaft 34 and additional valve 28 or closure element 32 is illustrated in more detail with reference to the diagram of FIG. 4. In this diagram, the abscissa shows the crankshaft angle in degrees, in short ° CA. The ordinate shows the lift of the gas exchange valves 5, 6. Entered in the diagram is an exhaust valve lifting curve 35 and an intake valve lifting curve 36. Both lifting curves 35, 36 overlap in a small area. The associated intersection point is arranged specifically at 0° CA and corresponds also to the upper dead center of a piston movement of the piston allocated to the viewed combustion chamber 4.

Figure 4:
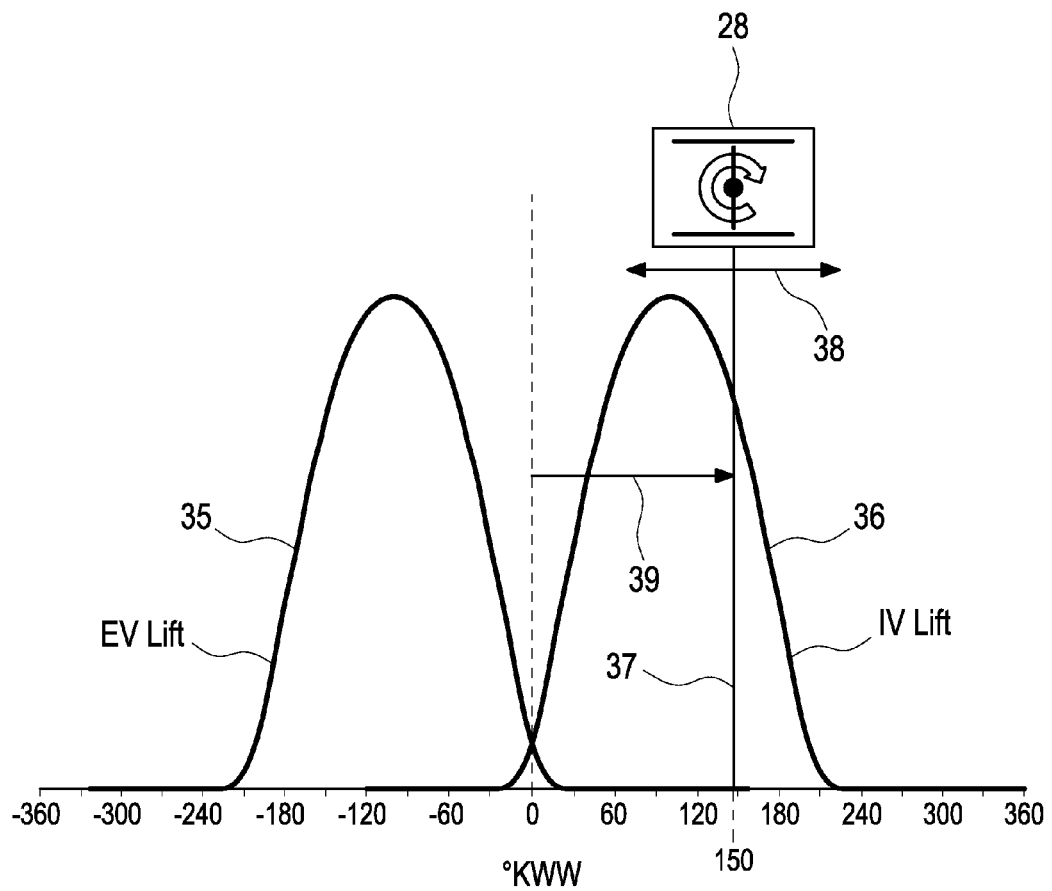
FIG. 4 shows a greatly simplified diagram for illustrating a phase shift between a closure element and a crankshaft.

Further, the diagram of FIG. 4 includes, in the form of a vertical line, a closing time 37 of the additional valve 28 allocated to the viewed combustion chamber 4, which additional valve is shown symbolically in FIG. 4 for illustration purposes. During a stationary activation of the additional valve 28, said closing time 37 is always in the same relation to the crankshaft 34, thus, is stationary always at the same crankshaft angle. In the example, the closing time 37 is at approximately 150° CA. The relative position of the closing time 37 relative to the crankshaft angle of the crankshaft 34 defines a phase position between the additional valve 28 or the associated rotating closure element 32 and a reference variable which is defined by the relative rotational position of the crankshaft 34. Said reference variable is in particular a reference time or a reference frequency or reference speed. According to a double arrow 38, this phase position is adjustable. The closing time 37, thus the phase position of the closure element 32, can be adjusted relative to the reference variable, thus relative to the rotational position of the crankshaft 34, towards smaller crankshaft angles as well as towards larger crankshaft angles, so as to change the phase position between additional valve 28 and crankshaft 34 or between closure element 32 and reference variable. An arrow 39 indicates that the closing time 37 can be shifted, for example from an initial phase position, at which the closing time 37 lies at 0° CA and thus runs congruent with the ordinate, to the shown position at which the closing time 37 lies at approximately 150° CA. It is clear that, principally, larger crankshaft angles for the closing 37 are also possible, e.g., an adjustability up to 240° CA can be provided.

Figure 5:
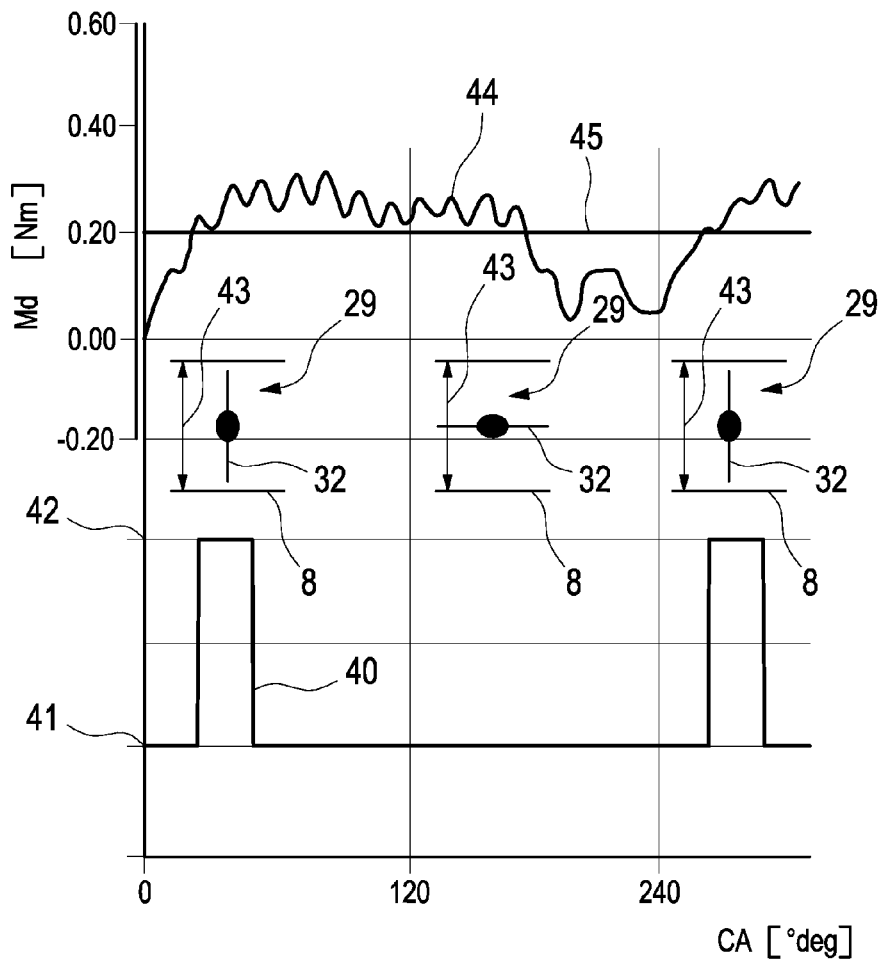
FIG. 5 shows a greatly simplified diagram for illustrating a relation between a phase position of the closure element and a crankshaft and the torques acting thereon.

In the diagram of FIG. 5, the ordinate represents a flow torque Md acting on the respective closure element 32 while the abscissa represents the crankshaft angle CA. A curve 40 indicates the control movement of the closure element 32 in the respective flow channel. At position 41, the closure element 32 is open while it is closed at position 42. In other words, if the curve 40 runs along the position 41, the closure element 32 releases more or less the cross-section through which a flow can pass of the associated flow channel. If the curve 40 runs along the position 42, the closure element 32 blocks the cross-section through which a flow can pass of the respective flow channel. In the diagram of FIG. 5, three closure devices 29 are symbolically indicated to symbolize the associated positions of the closure element 32. The cross-section through which a flow can pass and which is controllable by means of the closure element 32 is designated as 43. The flow channel is formed, e.g. by the fresh air channel 8 or by one of its tracts 8', 8". Alternatively, the flow channel of another embodiment can also be the exhaust gas channel 11 or one of its tracts 11', 11". Also possible is an embodiment in which the flow channel is formed by one of the recirculation channels 14. Also conceivable are any combinations of the above variants.

A curve 44 shows the course of a drive torque, which acts on the closure element 32 to drive the same, in dependence on the rotational position of the closure element 32. It is shown that the drive torques acting on the closure element 32 fluctuate around a mean torque 45 so that with respect to the mean torque 45, higher and lower torques occur. In the example of FIG. 5, the mean torque 45 has a positive value. In other embodiments, the mean torque 45 can also be neutral, thus has the value 0. In particular in this case, also negative torques can act on the closure element 32.

The torques plotted on the ordinate in FIG. 5 are, as illustrated, the drive torques to be provided by the closure element drive 30 which are necessary to compensate the flow torques acting on the closure element 32. Positive torques of the curve 44 which lie above the mean torque 45 are thus generated in case of stronger decelerating flow torques which act on the closure element 32 due to the flow, whereas negative torques of the curve 44, which lie below the mean torque 45, are generated in case of less decelerating or even accelerating flow torques.

The curves described here for the torques occur during stationary operating states of the piston engine 1 or the closure device 29. During non-stationary or transient operating states of the piston engine 1 or the closure device 29, thus, e.g. when accelerating the piston engine 1 or during a phase jump of the closure device 29, the drive torque can be considerably higher and independent on the flow torques.

FIG. 6 shows again a simplified curve 44' for illustrating the course of the flow torque at the closure element 32. In this configuration, the mean torque 45' has the value 0. In this case, negative flow torques correspond to decelerating or delaying flow forces at the closure element 32.

To change the phase position between the closure element 32 and the crankshaft 34, now, according to the operating method proposed here, the flow forces or flow torques acting on the closure element 32 can be utilized to accelerate or decelerate the closure element 32. A temporarily, short-time accelerating of the closure element 32 results in a shifting of the phase position of the closure element 32 relative to the reference variable or relative to the crankshaft angle of the crankshaft 34 towards early. With reference to 0° CA, the closure element 32 then blocks earlier. In contrast to that, a temporarily, short-time deceleration of the closure element 32 results in a shift of the phase position relative to the reference variable or relative to the angle of the crankshaft 34 towards late. With reference to 0° CA, the closure element 32 then blocks later.

In FIG. 6, a curve 56 symbolizes an increase of the phase angle, thus an adjustment of the phase position towards late. Here, a deceleration or delay of the closure element 32 takes place in a rotation angle range 57. It is apparent that this delay range 57 lies in a range of the flow torque curve 44' in which, with respect to the mean torque 45', negative torques exist. This means that decelerating or delaying flow forces act here on the closure element 32. Consequently, these flow forces or flow torques can be utilized for delaying the closure element 32. It is apparent that said delay phase lasts only a very short time and extends only over a few degrees CA, in particular less than 30° CA. In FIG. 6, a further curve 58 indicates a decrease of the phase angle, thus a shift of the phase position towards early. For this, the closure element 32 is accelerated for a short time in a rotation angle range 59. It is apparent that said accelerating rotation angle range 59 is arranged with respect to the flow torque curve 44' at the closure element 32 in such a manner that positive torques with respect to the mean torque 45 exist there. This means that accelerating flow forces or flow torques act here on the closure element 32. They are utilized here for accelerating the closure element 32. It is apparent that said acceleration of the closure element 32 takes place within a short time segment or a small crankshaft angle range. For example, said acceleration phase is smaller than 30° CA.

The proposed operating method utilizes the fluctuation of the forces or torques acting on the closure element 32 between minimum and maximum values. An acceleration of the closure element 32 is performed in the range of the minimum values because here, the lowest counter-forces or counter-torques act on the closure element 32. In particular, the forces or torques acting on the closure element 32 can also be negative so that they cause an acceleration of the closure element 32. Decelerating the closure element 32 advantageously takes place in the range of the maximum forces or torques such that the rotating resistance generated by the flow forces or flow torques provide a substantial contribution to the deceleration of the closure element 32.

Advantageously, decelerating the closure element 32 takes place in a rotation angle range in which the closure element 32 opens the associated flow cross-section 43 to the maximum. It was found that the forces acting on the closure element 32 in this rotation angle range are minimal. In contrast to that, the temporary deceleration of the closure element 32 takes place in a rotation angle range in which the closure element 32 blocks the associated flow cross-section 43 to the maximum.

It was found that the highest forces or torques counteracting the movement of the closure element can be expected in this rotation angle range.

To determine the relative rotational position of the closure element 32, according to FIG. 1, at least one rotational position detection device 50 can be provided. In the example of FIG. 1, one rotational position detection device 50 is allocated to each of the two closure elements 32 or the two additional valves 28. For coupled closure elements 32, as in the embodiment shown in FIG. 2, one rotational position detection device 50 is sufficient. The respective rotational position detection device 50 interacts with a control device 46 which is illustrated in FIG. 1 in a simplified manner. The control device 46 is configured or programmed in such a manner that it is suitable for operating the additional valves 28 or closure devices 29. In particular, the control device 46 can perform the above described operating methods as well as the ones yet to be described hereinafter.

In particular, when changing the phase position of the closure elements 32, the control device 46 can consider the relative rotational position of the closure elements 32 which it receives in the respective rotational position detection device 50.

FIGS. 7 and 8 show two fundamentally different designs for the closure device 29. Here, FIG. 7 shows an embodiment without recess, while FIG. 8 shows an embodiment with a recess 60. Said recess 60 is incorporated in a wall of the respective flow channel, e.g. the fresh air channel 8. Due to its rotation during a predetermined, limited rotation angle range, the closure element 32 configured as flap gate plunges into said recess 60.

This rotation angle can be, e.g. 90°. The recess 60 allows an increase of the closing angle range. While the closure element 32 in the embodiment without recess 60 shown in FIG. 7 has a very small closing angle range, the embodiment with recess 60 represented in FIG. 8 shows a significantly larger closing angle range. While in FIG. 7, the closure element 32 blocks the cross-section 43, through which a flow can pass, substantially only in the position perpendicular to a flow direction indicated by an arrow 61, the closure element 32 shown in FIG. 8 blocks the cross-section 43, through which a flow can pass, in each rotational position in which it is situated within the recesses 60.

Figure 9:
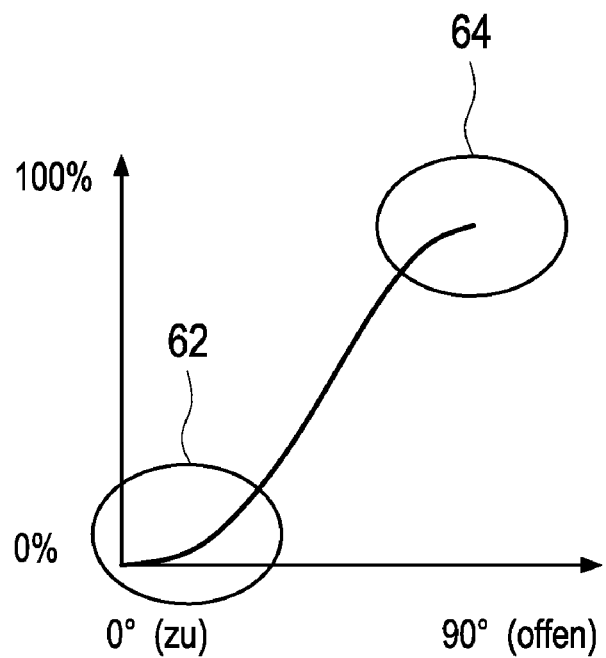
FIG. 9 shows a greatly simplified diagram for illustrating the control function of the closure element without recess in the flow channel.
Figure 10:
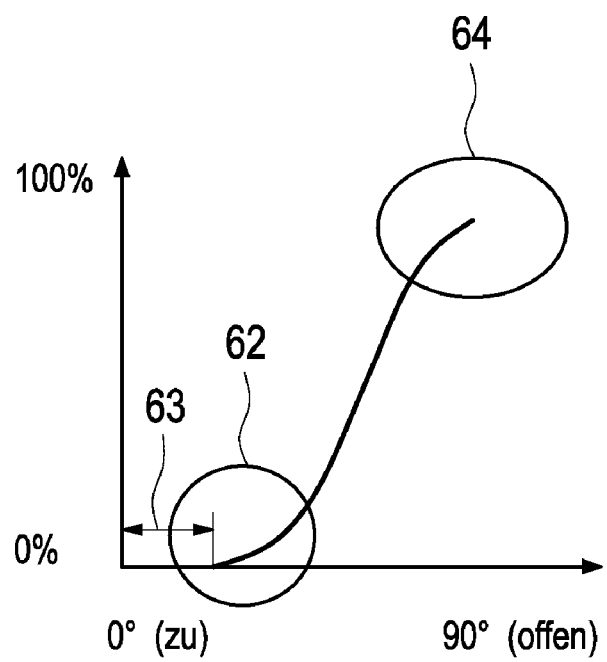
FIG. 10 shows a diagram as in FIG. 9, but for a closure element with recess in the flow channel.

FIGS. 9 and 10 show diagrams in which the ordinate indicates the free cross-section 43, through which a flow can pass, from 0% to 100%, while the abscissa indicates the pivot angle of the closure element 32 in a range from 0° (perpendicular to the flow direction 61) to 90° (parallel to the flow direction 61). FIG. 9 belongs here to the embodiment according to FIG. 7 without recess 60, while FIG. 10 belongs to the embodiment according to FIG. 8 with recess 60.

Advantageously, maintaining a desired phase position can be implemented by means of the control device 46 in such a manner that a control of the phase position takes place only in at least one predetermined rotation angle region, while for the rest, thus in all other rotation angle ranges, only a feedback control of the rotational speed, thus, virtually, a position control is performed. In a closure device 29, in which the drive 30 is formed by means of an electric motor, the rotational speed of the closure element 32 is determined by the energization of the electrical drive 30. By changing the energization, thus, the rotational speed of the closure element 32 can be changed.

To implement in such an electrical drive 30 that the desired phase position is maintained at a desired speed, the control device 46 is configured in such a manner that it controls the energization of the electrical drive 30 only in at least one predetermined rotation angle range of the closure element 32, while, besides that, it controls the energization, thus adjusts it to an energization value that is allocated to the desired rotational speed. The control or feedback control of the energization effects a feedback control of the rotational speed of the closure element 32. In contrast to the feedback control, such a control of the energization can be implemented in an extremely simple manner and involves comparatively low energy consumption. However, the phase position of the closure element 32 can vary during said speed control because the speed control itself is not able to directly compensate the forces or torques acting on the closure element 32. In contrast to that, the feedback control of the phase positions or the feedback control of the position allows a correction of the phase position in order to be able to compensate or adjust the phase deviation at the closure element 32 which occurs due to the forces or torques acting thereon.

In FIGS. 9 and 10, rotation angle ranges 62 are marked in which the adherence to the desired phase position between closure element 32 and reference variable or crankshaft 34 is important, and in which the feedback control of the phase position is carried out. In the example, the same are each rotation angle range in which the closure element 32 moves out of its closing angle range. In FIG. 9, this is a range following a 0° rotation angle. In FIG. 10, this is a range which is offset with respect to the 0° rotation angle by a value 63. The value 63 defines half of the rotation angle range of the recess 60.

Moreover, in FIGS. 9 and 10, rotation angle ranges 64 are marked in which maintaining the phase position is not important. The feedback control of the phase position takes place in the rotation angle ranges 62. In all other rotation angles, a control of the phase position can be sufficient.

In the example of FIGS. 9 and 10, the feedback control of the phase position thus takes place at the end of the closing angle range of the closure element 32. In another embodiment, the feedback control of the phase position can take place at the beginning of the closing angle range of the respective closure element 32, whereby the start of closing is defined. Also possible is an embodiment in which the feedback control extends over the entire closing angle range including a phase-in range and a phase-out range.

In an alternative configuration of the feedback control or control of the phase position it can be provided to implement the adherence to a desired actual phase position over the entire rotation angle range of the closure element 32 by means of a position feedback control. However, for such a permanent position feedback control it is additionally provided to modulate the target phase position depending on the flow forces and/or flow torques acting on the closure element 32 and depending on the actual rotation angle position 32. The modulation of the target values for the phase position considers the forces or torques at the closure element 32 which vary depending on the rotation angle position 32 and can thereby generate a target value curve which results in a minimal energy demand for the position feedback control. Advantageously, the modulation of the target values towards small target-actual deviations can take place at least at the beginning and/or at the end of a closing angle range in which the closure element 32 blocks the cross-section 43 through which a flow can pass, or over the entire closing angle range.

In a further alternative configuration of the feedback control or control of the phase position it can be provided to implement the adherence to a desired actual phase position over the entire rotation angle range of the closure element 32 again, as above, by means of a position feedback control. However, in this case of the permanent position feedback control it is additionally provided to modulate a range of permissible deviations, which occur between the actual phase position and the target phase position but do not initiate a feedback control intervention, depending on the flow forces and/or flow torques acting on the closure element 32 and depending on the actual rotation angle position 32. The modulation of the range of permissible target-actual deviations for the phase position considers the forces or torques at the closure element 32 which vary depending on the rotation angle position 32 and can thereby generate a curve for said permissible range that results in a minimal energy demand for the position feedback control. For this, said permissible range is varied in such a manner that in the ranges of the rotational movement of the closure element 32, which ranges have to meet only minor position demands, the permissible deviations are relatively large. Advantageously, the modulation of the permissible range towards small target-actual deviations can take place at least at the beginning and/or at the end of a closing angle range in which the closure element 32 blocks the cross-section 43 through which a flow can pass, or over the entire closing angle range.

In another configuration of the feedback control or control of the phase position which can be used additionally or alternatively, it can also be provided to implement the adherence to the desired actual phase position over the entire rotation angle range of the closure element 32 again, as above, by means of a position feedback control. However, in this case of permanent position feedback control it is additionally provided to modulate, depending on the flow forces and/or flow torques acting on the closure element 32 and depending on the actual rotation angle position 32, parameters of the feedback control, thus feedback control parameters and/or parameters of a controller used for feedback control, thus controller parameter, which parameters determine the reaction of the feedback control or the controller to a target-actual deviation. The modulation of the feedback control parameters or the controller parameters considers the forces or torques at the closure element 32 which vary depending on the rotation angle position 32, and can thereby generate a course for said permissible range which results in a minimal energy demand for the position feedback control. For this, the feedback control parameters are varied in such a manner that in the ranges of the rotational movement of the closure element 32, which ranges have to meet only minor position demands, the performed feedback control interventions are relatively small or weak. Advantageously, the modulation of the feedback control parameter towards small target-actual deviations can take place at least at the beginning and/or at the end of a closing angle range in which the closure element 32 blocks the cross-section 43 through which a flow can pass, or over the entire closing angle range.

Although in the embodiments introduced herein, the closure device 29 is preferably used in a fresh air channel 8 or a fresh air tract 8', 8", it is also possible, in other embodiments, to form the flow channel, in which the closure device 29 is used, by an exhaust gas tract 11', 11", wherein the respective closure element 32 then is arranged downstream of outlet valves 6.

In addition to the above mentioned control measures, further measures can be performed, e.g. to specifically influence the forces or torques acting on the closure element 32. For example, by means of an appropriate design of closure element 32 configured as flap gate 32, the strength of the alternating torque can be weakened, which alternating torque occurs when the flap gate 32 passes the zero position in the center axis of the respective flow channel. The thinner the shaft 33 of the flap gate 32 can be formed, the smaller is the changing range in which the strong torque change takes place. The thicker the shaft 33 of the flap gate 32 is made, the more the changing range can be distributed over greater angular values, whereby the strong torque change takes place in a less abrupt manner. Furthermore, contouring the flap gate 32 is conceivable, e.g. in the form of a wing, to achieve similar reductions of the disturbing torques. It is also possible to use, instead of flap gates 32, different valve members within the additional valves 28, such as, e.g. rotary slide valves. In this manner, more favorable characteristics with respect to the occurring accelerating or decelerating disturbance torques acting on the desired rotational movement can be implemented.

The invention claimed is:

1. A method; comprising: operating at least one rotating closure element in a flow channel; alternately opening and blocking the flow channel relative to a reference variable and with an adjustable phase position; flowing through a cross-section; changing a phase position; and utilizing at least one of a flow force and a flow torque to act on the closure element for at least one of temporarily accelerating and temporarily decelerating the closure element.

2. The method according to claim 1, utilizing at least one of the flow force and the flow torque acting on and driving the closure element when the phase position is adjusted towards early, and utilizing at least one of the flow force and the flow torque acting on and decelerating the closure element when the phase position is adjusted towards late.

3. The method according to claim 1, utilizing at least one of temporarily accelerating and temporarily decelerating the closure element takes place in a rotation angle range in which at least one of the flow force and the flow torque are driven to act on the closure element.

4. The method according to claim 1, utilizing at least one of temporarily accelerating and temporarily decelerating the closure element takes place in a rotation angle range in which the closure element generates at least one of a maximum opening and a maximum blocking of the cross-section through which a flow can pass.

5. The method according to claim 1, providing the flow channel for at least one of supplying fresh air to a piston engine, for discharging exhaust gas from a piston engine, and for exhaust gas recirculation in a piston engine, wherein the reference variable is defined by the rotation angle of a crankshaft of the piston engine.

6. The method according to claim 1, determining a relative rotational position of the closure element by a rotational position detection device and considering by a control device interacting with the rotational position detection device for changing the phase position.

7. The method according to claim 1, using an electric motor to drive the closure element the, and changing the energization for adjusting at least one of a rotational speed and a rotation angle of the closure element.

8. The method according claim 1, maintaining a desired phase position only in at least one predetermined rotation angle range by a feedback control of the rotation angle of the closure element and apart from that by a feedback control of the rotational speed of the closure element.

9. The method according to claim 8, carrying out the feedback control by at least one of at the beginning and at the end of a closing angle range in which the closure element blocks the cross-section through which a flow can pass.

10. The method according to claim 1, maintaining a desired actual phase position over the entire rotation angle range of the closure element is carried out by a feedback control, modulating a target phase position depending on at least one of the flow forces and the flow torques acting on the closure element and depending on the rotation angle position of the closure element.

11. The method according to claim 10, modulating takes place during at least one of at the beginning and at the end of a closing angle range in which the closure element blocks the cross-section through which a flow can pass.

12. The method according to claim 1 , maintaining a desired actual phase position over the entire rotation angle range of the closure element is carried out by a feedback control, modulating a range of permissible deviations from a target phase position is modulated depending on at least one of the flow forces and the flow torques acting on the closure element and depending on the rotation angle position of the closure element.

13. The method according to claim 1, maintaining a desired actual phase position over the entire rotation angle range of the closure element is carried out by a feedback control, modulating at least one of feedback control parameters and controller parameters depending on at least one of the flow forces and flow torques acting on the closure element and depending on the rotation angle position of the closure element.

14. The method according to claim 1, wherein the flow channel is at least one of a fresh air channel of a piston engine and an exhaust gas channel of a piston engine, arranging the closure element at least one of upstream of inlet valves for controlling gas exchange processes and downstream of outlet valves for controlling gas exchange processes, and wherein the flow channel is an exhaust gas recirculation channel of a piston engine, arranging the closure element between an extraction point on the fresh air side and an intake point on the exhaust gas side for controlling an exhaust gas recirculation rate.

15. A closure device for controlling a piston engine flow channel, comprising: at least one closure element which is rotatably driven during operation for alternately opening and blocking a cross-section, wherein a flow passes through a flow channel; and a control for actuating a drive of the closure element wherein the control is at least one of configured and programmed such that it can actuate the closure device relative to a reference variable and with an adjustable phase position; flowing through a cross-section; changing a phase position; and utilizing at least one of a flow force and a flow torque to act on the closure element for at least one of temporarily accelerating and temporarily decelerating the closure element.

16. The closure device according to claim 15, wherein at least one of temporarily accelerating and temporarily decelerating the closure element takes place in a rotation angle range in which at least one of the flow force and the flow torque are driven to act on the closure element.

17. The closure device according to claim 15, wherein at least one of temporarily accelerating and temporarily decelerating the closure element takes place in a rotation angle range in which the closure element generates at least one of a maximum opening and a maximum blocking of the cross-section through which a flow can pass.

18. The closure device according to claim 15, wherein the flow channel is provided for at least one of supplying fresh air to a piston engine, for discharging exhaust from a piston engine, and for exhaust gas recirculation in a piston engine, wherein the reference variable is defined by the rotation angle of a crankshaft of the piston engine.

19. The closure device according to claim 15, wherein a relative rotational position of the closure element is determined by a rotational position detection device and is considered by a control device interacting with the rotational position detection device for changing the phase position.

20. The closure device according to claim 15, wherein an electric motor is used to drive the closure element the, and wherein the energization is changed for adjusting at least one of a rotational speed and a rotation angle of the closure element.

\* \* \* \* \*